United States Patent
Kang et al.

(10) Patent No.: US 10,076,946 B2
(45) Date of Patent: Sep. 18, 2018

(54) HEAT PUMP SYSTEM FOR VEHICLE

(71) Applicant: HALLA VISTEON CLIMATE CONTROL CORP., Daejeon (KR)

(72) Inventors: Sung Ho Kang, Daejeon (KR); Hak Kyu Kim, Daejeon (KR); Sang Ki Lee, Daejeon (KR); Young Ho Choi, Daejeon (KR); Jung Jae Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 227 days.

(21) Appl. No.: 14/766,881

(22) PCT Filed: Apr. 15, 2014

(86) PCT No.: PCT/KR2014/003224
§ 371 (c)(1),
(2) Date: Aug. 10, 2015

(87) PCT Pub. No.: WO2014/175589
PCT Pub. Date: Oct. 30, 2014

(65) Prior Publication Data
US 2016/0016456 A1      Jan. 21, 2016

(30) Foreign Application Priority Data

Apr. 23, 2013 (KR) .................... 10-2013-0044724

(51) Int. Cl.
*B60H 1/03* (2006.01)
*B60H 1/00* (2006.01)
(Continued)

(52) U.S. Cl.
CPC ..... *B60H 1/00899* (2013.01); *B60H 1/00907* (2013.01); *B60H 1/08* (2013.01);
(Continued)

(58) Field of Classification Search
CPC .................. B60H 1/00907; B60H 2001/00949
(Continued)

(56) References Cited

U.S. PATENT DOCUMENTS

| 5,085,058 A * | 2/1992 | Aaron et al. | F25B 41/06 138/44 |
| 5,899,086 A * | 5/1999 | Noda et al. | B60H 1/00914 165/42 |

(Continued)

FOREIGN PATENT DOCUMENTS

| DE | 10141389 A1 | 3/2003 |
| EP | 1361091 A1 | 11/2003 |

(Continued)

OTHER PUBLICATIONS

Written Opinion of the International Searching Authority dated Jul. 4, 2014.

*Primary Examiner* — Allen Flanigan
(74) *Attorney, Agent, or Firm* — Dickinson Wright PLLC (57) ABSTRACT

A heat pump system for a vehicle which uses an evaporator of an air-conditioning case for common use in an air-conditioning mode and in a heat pump mode for cooling and heating so as to reduce weight and manufacturing costs. The heat pump system can be applied without any change in structure of the air-conditioning case, and can be operated even at low temperature without any influence of outdoor temperature because the heat pump system uses waste heat of an engine so as to enhance fuel efficiency and increase heating performance and efficiency.

4 Claims, 4 Drawing Sheets

(51) Int. Cl.
*F25B 27/02* (2006.01)
*B60H 1/08* (2006.01)
*F25B 5/04* (2006.01)
*F25B 6/04* (2006.01)
*F25B 40/06* (2006.01)
*B60H 1/22* (2006.01)
*B60H 1/32* (2006.01)

(52) U.S. Cl.
CPC .............. *B60H 1/22* (2013.01); *B60H 1/3213* (2013.01); *F25B 5/04* (2013.01); *F25B 6/04* (2013.01); *F25B 27/02* (2013.01); *F25B 40/06* (2013.01); *B60H 2001/00928* (2013.01); *B60H 2001/00949* (2013.01); *F25B 2400/0409* (2013.01); *F25B 2400/0411* (2013.01); *Y02A 30/274* (2018.01)

(58) Field of Classification Search
USPC .............................. 165/42, 43, 202, 203, 204
See application file for complete search history.

(56) References Cited

U.S. PATENT DOCUMENTS

| | | | | |
|---|---|---|---|---|
| 6,047,770 A * | 4/2000 | Suzuki et al. | ..... | B60H 1/00007 165/202 |
| 6,810,952 B2 * | 11/2004 | Ben Fredj et al. | .... | B60H 1/323 165/140 |
| 7,055,590 B2 * | 6/2006 | Hara | ................. | B60H 1/00314 165/202 |
| 7,063,137 B2 | 6/2006 | Kadle et al. | | |
| 9,180,754 B2 * | 11/2015 | Wang et al. | ....... | B60H 1/00921 |
| 2001/0013409 A1 * | 8/2001 | Burk et al. | ............. | B60H 1/025 165/240 |
| 2001/0020529 A1 * | 9/2001 | Karl | ................... | B60H 1/00007 165/202 |
| 2004/0182097 A1 * | 9/2004 | La Falce et al. | ....... | B60H 1/322 62/226 |
| 2006/0102333 A1 * | 5/2006 | Zeigler et al. | ..... | B60H 1/00378 165/240 |
| 2007/0271943 A1 | 11/2007 | Baruschke et al. | | |
| 2008/0196877 A1 * | 8/2008 | Zeigler et al. | ...... | B60H 1/00907 165/202 |
| 2012/0227431 A1 | 9/2012 | Wang et al. | | |
| 2013/0025311 A1 | 1/2013 | Graaf et al. | | |

FOREIGN PATENT DOCUMENTS

| | | |
|---|---|---|
| JP | 2005289095 A | 10/2005 |
| JP | 2010125912 A | 6/2010 |
| KR | 20020032216 A | 5/2002 |

\* cited by examiner

HEAT PUMP SYSTEM FOR VEHICLE

CROSS-REFERENCE TO RELATED APPLICATIONS

This application is a National Stage of International Application No. PCT/KR2014/003224 filed Apr. 15, 2014 which claims the benefit and priority of Korean Application No. 10-2013-0044724 filed Apr. 23, 2013. The entire disclosure of each of the above applications is incorporated herein by reference.

FIELD

The present invention relates to a heat pump system for a vehicle, and more particularly, to a heat pump system for a vehicle, which can use an evaporator of an air-conditioning case for common use in an air-conditioning mode and in a heat pump mode for cooling and heating so as to reduce weight and manufacturing costs because the heat pump system can be applied without any change in structure of the air-conditioning case, and which can be operated even at low temperature without any influence of outdoor temperature because the heat pump system uses waste heat of an engine so as to enhance fuel efficiency and increase heating performance and efficiency.

BACKGROUND

In general, an air conditioner for a vehicle includes a cooling system for cooling the interior of the vehicle and a heating system for heating the interior of the vehicle. At an evaporator side of a refrigerant cycle, the cooling system converts air into cold air by heat-exchanging the air passing outside an evaporator with refrigerant flowing inside the evaporator so as to cool the interior of the vehicle. At a heater core side of a cooling water cycle, the heating system converts air into warm air by heat-exchanging the air passing outside the heater core with cooling water flowing inside the heater core so as to heat the interior of the vehicle.

Moreover, a hybrid vehicle which is operated by an engine (internal combustion engine) and an electric motor uses waste heat (cooling water) of the engine as a heat source for heating the interior of the vehicle.

That is, the hybrid vehicle uses the air conditioner for heating in the same way as the conventional vehicles because the waste heat of the engine is sufficient when the vehicle is operated by the engine, but uses the remaining heat of engine cooling water as the heat source even though the engine is turned off when the vehicle is operated by the electric motor.

In the case that the vehicle is operated by the electric motor, if outdoor temperature is low (below zero), the vehicle cannot be operated by the electric motor due to a lack of the remaining heat of the engine cooling water when the engine cooling water is below a predetermined temperature. However, the engine is forcedly operated in order to secure the heat source for heating, such that the fuel efficiency of the hybrid vehicle is deteriorated.

In order to improve the fuel efficiency of the hybrid vehicle at low temperature, air conditioners to each of which a heat pump system is applied have been developed.

Figure 1:
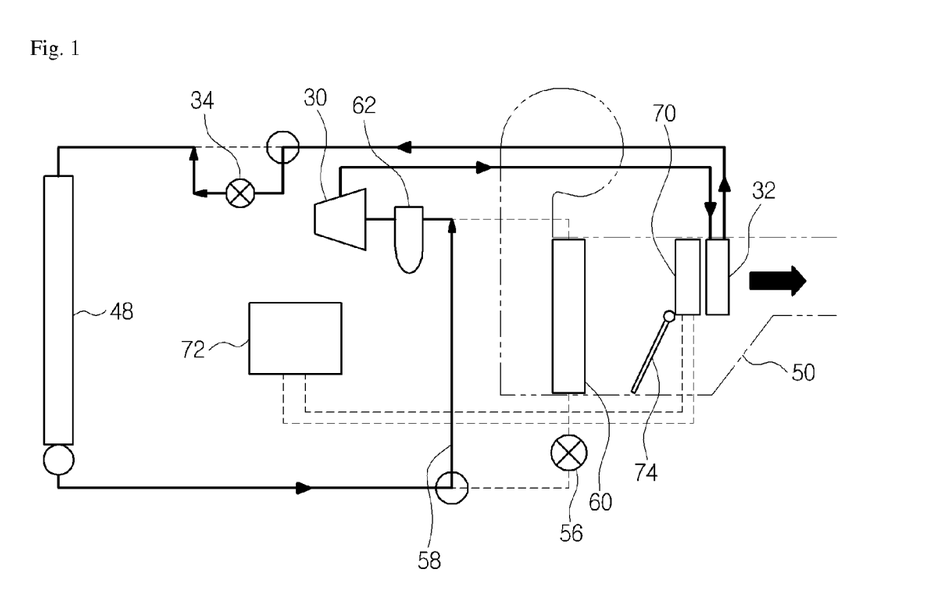
FIG. 1 is a configurative diagram of a conventional heat pump system for a vehicle.

FIG. 1 illustrates an example of a conventional heat pump system for a vehicle. As shown in FIG. 1, the heat pump system for the vehicle includes: a compressor 30 for compressing and discharging refrigerant; an interior heat exchanger 32 for radiating heat of the refrigerant discharged from the compressor 30; a first expansion valve 34 mounted in parallel for selectively expanding the refrigerant passing through the interior heat exchanger 32; an exterior heat exchanger 48 for heat-exchanging the refrigerant passing through the first expansion valve 34 outdoors; an evaporator 60 for evaporating the refrigerant passing through the exterior heat exchanger 48; an accumulator 62 for dividing the refrigerant passing through the evaporator 60 into a gas-phase refrigerant and a liquid-phase refrigerant; a second expansion valve 56 for selectively expanding the refrigerant supplied to the evaporator 60; and a bypass line 58 for making the refrigerant passing through the exterior heat exchanger 48 bypass the second expansion valve 56 and the evaporator 60 in a heat pump mode.

The evaporator 60 and the interior heat exchanger 32 are respectively mounted inside an air-conditioning case 50, and in this instance, a heater core 70 is mounted between the evaporator 60 and the interior heat exchanger 32 inside the air-conditioning case 50.

Cooling water of an engine 72 is circulated inside the heater core 70, and a temperature adjustable door 74 adapted for adjusting a mixed amount of cold wind and warm wind is mounted between the evaporator 60 and the heater core 70.

The conventional heat pump system for the vehicle having the above-mentioned structure, in the heat pump mode (the maximum heating mode), the refrigerant discharged from the compressor 30 passes through the interior heat exchanger 32, the first expansion valve 34, the exterior heat exchanger 48, the bypass line 58, and the accumulator 62 in order, and then, is returned to the compressor 30. In this instance, the interior heat exchanger 32 serves as a heater and the exterior heat exchanger 48 serves as an evaporator.

Therefore, in the heat pump mode, the heat pump system carries out heating using the interior heat exchanger 32 under the condition that the vehicle is operated by the electric motor, but carries out heating using the heater core 70 in which the cooling water of the engine 72 circulates under the condition that the vehicle is operated by the engine, so as to enhance fuel efficiency.

In the meantime, in an air-conditioning mode (the maximum cooling mode), the refrigerant discharged from the compressor 30 passes through the interior heat exchanger 32, the exterior heat exchanger 48, the second expansion valve 56, the evaporator 60, and the accumulator 62 in order, and then, is returned to the compressor 30. In this instance, the interior heat exchanger 32 which is closed by the temperature adjustable door 74 serves as a heater like in the heat pump mode, and the evaporator 60 serves as a cooler.

However, in case that the conventional heat pump system for the vehicle is applied in order to enhance fuel efficiency at low temperature, because the waste heat of the engine 72 and the heat pump system are used together, the interior heat exchanger 32 which is a heat exchanger for a heat pump is added inside the air-conditioning case 50, and hence, it is difficult to use the air-conditioning case 50 commonly and manufacturing costs are increased due to an increase in size and weight of the air-conditioning case 50.

SUMMARY OF THE INVENTION

Accordingly, the present invention has been made to solve the above-mentioned problems occurring in the prior arts, and it is an object of the present invention to provide a heat pump system for a vehicle, which can use an evaporator of an air-conditioning case for common use in an air-conditioning mode and in a heat pump mode for cooling and heating so as to reduce weight and manufacturing costs because the heat pump system can be applied without any change in structure of the air-conditioning case, and which can be operated even at low temperature without any influence of outdoor temperature because the heat pump system uses waste heat of an engine so as to enhance fuel efficiency and increase heating performance and efficiency.

To achieve the above objects, the present invention provides a heat pump system for a vehicle including: a compressor for compressing and discharging refrigerant; an evaporator mounted inside an air-conditioning case for exchanging heat between the air inside the air-conditioning case and the refrigerant; an exterior heat exchanger mounted outside the air-conditioning case for exchanging heat between the refrigerant and the outdoor air; expansion means arranged between the evaporator and the exterior heat exchanger for expanding the refrigerant; a waste heat exchanger for exchanging heat between waste heat of the vehicle and the refrigerant; a first refrigerant circulation line which connects a refrigerant line in such a manner that refrigerant discharged from the compressor circulates the exterior heat exchanger, the expansion means, the evaporator and the compressor in order in an air-conditioning mode; and a second refrigerant circulation line which connects a refrigerant line in such a manner that refrigerant discharged from the compressor circulates the evaporator, the expansion means, the waste heat exchanger and the compressor in order in a heat pump mode, wherein the evaporator is used commonly in such a way as to carry out a cooling action in the air-conditioning mode and to carry out a heating action in the heat pump mode.

According to the preferred embodiment of the present invention, the heat pump system for the vehicle can use the evaporator of the air-conditioning case for common use in the air-conditioning mode and in the heat pump mode for cooling and heating so as to reduce weight and manufacturing costs because the heat pump system can be applied without any change in structure of the air-conditioning case.

Moreover, the heat pump system for the vehicle according to the preferred embodiment of the present invention can reduce the number of components and manufacturing costs because the interior heat exchanger which is mounted inside the air-conditioning case in the conventional heat pump system is not mounted in the heat pump system of the present invention.

Furthermore, the heat pump system for the vehicle according to the preferred embodiment of the present invention can be operated even at low temperature without any influence of outdoor temperature because the heat pump system uses waste heat of an engine so as to enhance fuel efficiency and increase heating performance and efficiency.

BRIEF DESCRIPTION OF DRAWINGS

The above and other objects, features and advantages of the present invention will be apparent from the following detailed description of the preferred embodiments of the invention in conjunction with the accompanying drawings, in which:

FIG. 2 is a configurative diagram of an air-conditioning mode of the heat pump system in a state where an engine is turned on;

DETAILED DESCRIPTION

Reference will be now made in detail to the preferred embodiment of the present invention with reference to the attached drawings.

First, a heat pump system for a vehicle according to the present invention includes a compressor 100, an evaporator 110, an exterior heat exchanger 130, an expansion means 120, a waste heat exchanger 140, a first refrigerant circulation line R1, and a second refrigerant circulation line R2, and it is preferable that the heat pump system be applied to a hybrid vehicle.

The first refrigerant circulation line R1 is a line for circulating refrigerant in an air-conditioning mode, and the second refrigerant circulation line R2 is a line for circulating refrigerant in a heat pump mode.

The first refrigerant circulation line R1 forms a refrigerant line in such a manner that refrigerant discharged from the compressor 100 circulates the exterior heat exchanger 130, the expansion means 120, the evaporator 110 and the compressor 100 in order in the air-conditioning mode, but forms a refrigerant line in such a manner that the refrigerant discharged from the compressor 100 circulates the evaporator 110, the expansion means 120, the waste heat exchanger 140 and the compressor 100 in order in the heat pump mode.

In this instance, the first refrigerant circulation line R1 and the second refrigerant circulation line R2 commonly use partial sections of the first and second refrigerant circulation lines R1 and R2.

That is, the partial sections of the first and second refrigerant circulation lines R1 and R2 are formed integrally, such that the first and second refrigerant circulation lines R1 and R2 can use them commonly. As shown in the drawing, a section (a) to which the compressor 100 is connected and a section (b) to which the evaporator 110 and the expansion means 120 are connected become the common sections (a) and (b) of the first and second refrigerant circulation lines R1 and R2.

Meanwhile, the exterior heat exchanger 130 is mounted on the first refrigerant circulation line R1, and the waste heat exchanger 140 is mounted on the second refrigerant circulation line R2.

Therefore, according to direction changes of first and second direction-changing valves 181 and 182, in the air-conditioning mode, the refrigerant discharged from the compressor 100 circulates the exterior heat exchanger 130, the expansion means 120, the evaporator 110 and the compressor in order while flowing along the first refrigerant circulation line R1, and in the heat pump mode, the refrigerant discharged from the compressor 100 circulates the evaporator 110, the expansion means 120, the waste heat exchanger 140 and the compressor 100 in order while flowing along the second refrigerant circulation line R2.

As described above, the heat pump system according to the preferred embodiment of the present invention commonly uses the evaporator 110 mounted inside the air-conditioning case 150 not only in the air-conditioning mode but also in the heat pump mode.

Hereinafter, the heat pump system according to the preferred embodiment of the present invention will be described by components in detail.

First, the compressor 100 inhales and compresses refrigerant while operating by receiving a driving force from an engine 161 (internal combustion engine) or an electric motor (not shown), and then, discharges the refrigerant in a gas phase of high temperature and high pressure.

In this instance, it is preferable that the compressor 100 be an electric-drive compressor which is driven by a motor in order to carry out heating and cooling even in a state where the engine 161 is turned off. When the electric-drive compressor is used, the compressor can be operated without regard to operation or non-operation of the engine 161.

Furthermore, the compressor 100 is mounted in the common section (a) of the first and second refrigerant circulation lines R1 and R2, so as to inhale and compress the refrigerant discharged from the evaporator 110 and supply the compressed refrigerant to the exterior heat exchanger 130 mounted on the first refrigerant circulation line R1 in the air-conditioning mode, and to inhale and compress the refrigerant discharged from the waste heat exchanger 140 and supply the compressed refrigerant to the evaporator 110 mounted on the second refrigerant circulation line R2 in the heat pump mode.

Additionally, the evaporator 110 is mounted inside the air-conditioning case 150 in order to exchange heat between air and refrigerant flowing inside the air-conditioning case 150.

In addition, the evaporator 110 is connected to the common section (b) of the first and second refrigerant circulation lines R1 and R2, so as to cool air by exchanging heat between the refrigerant of low-temperature and low-pressure discharged from the expansion means 120 and the air inside the air-conditioning case 150 and supply the refrigerant evaporated during the heat-exchanging process in the air-conditioning mode, and to heat the air inside the air-conditioning case 150 by exchanging heat between the refrigerant of high-temperature and high-pressure discharged from the compressor 100 and the air of the air-conditioning case 150 and supply the refrigerant condensed during the heat-exchanging process to the expansion means 120.

As described above, the evaporator 110 serves as the evaporator 110 so as to cool the interior of the vehicle in the air-conditioning mode, but serves as a condenser (heater) so as to heat the interior of the vehicle in the heat pump mode.

In the meantime, the conventional evaporator serves only to cool the inside because only refrigerant of low-temperature and low-pressure flows. However, inside the evaporator 110 according to the preferred embodiment of the present invention, the evaporator 110 is constructed in such a manner that refrigerant of low-temperature and low-pressure flows in the air-conditioning mode but refrigerant of high-temperature and high-pressure flows in the heat pump mode, such that the refrigerant can flow bidirectionally inside the evaporator 110.

Moreover, the exterior heat exchanger 130 is mounted outside the air-conditioning case 150 so as to exchange heat between the outdoor air and the refrigerant.

Here, the exterior heat exchanger 130 is mounted in front of an engine room of the vehicle, and exchanges heat between the outdoor air and the refrigerant which is discharged from the compressor 100 and flows inside the first refrigerant circulation line R1.

The exterior heat exchanger 130 serves as a condenser in the air-conditioning mode, and in this instance, refrigerant of high-temperature flowing inside the exterior heat exchanger 130 exchanges heat with the outdoor air and is condensed. The refrigerant does not flow in the heat pump mode.

Furthermore, the expansion means 120 is arranged between the evaporator 110 and the exterior heat exchanger 130 so as to expand the refrigerant.

In other words, the expansion means 120 is constructed by an orifice tube mounted in the common section (b) of the first and second refrigerant circulation lines R1 and R2, which is located at one side of the evaporator 110, and can be expanded bidirectionally relative to the refrigerant flowing along the first refrigerant circulation line R1 and the refrigerant flowing along the second refrigerant circulation line R2.

In this instance, it is preferable that the expansion means 120 use the orifice tube which is expandable bidirectionally, but may use an expansion valve.

Therefore, in the air-conditioning mode, the refrigerant which is discharged from the compressor 100 and passes the exterior heat exchanger 130 is expanded while passing the expansion means 120 and supplied to the evaporator 110. However, in the heat pump mode, the refrigerant which is discharged from the compressor 100 and passes through the evaporator 110 is expanded while passing the expansion means 120 and supplied to the waste heat exchanger 140.

Additionally, a heater core 160 which is connected with the engine 161 of the vehicle through a cooling water circulation line W is mounted inside the air-conditioning case 150.

In this instance, a water pump 162 is mounted on the cooling water circulation line W in order to circulate cooling water of the engine 161 toward the heater core 160.

Therefore, when the engine 161 is turned on, the heat pump system circulates the cooling water heated by the engine 161 toward the heater core 160 such that the air flowing inside the air-conditioning case 150 is heated while passing the heater core 160 so as to carry out heating. However, when the engine 161 is turned off, the cooling water does not circulate the heater core 160. Of course, in the case that the engine 161 is turned off, the heat pump system can operate the water pump 162 using the remaining heat of the engine 161 so as to circulate the cooling water of the engine 161 toward the heater core 160 and the waste heat exchanger 140.

In addition, a temperature adjustable door 151 adapted for adjusting an amount of air bypassing the heater core 160 and an amount of air passing the heater core 160 is mounted between the evaporator 110 and the heater core 160 inside the air-conditioning case 150.

The temperature adjustable door 151 can properly control temperature of the air discharged from the air-conditioning case 150 by adjusting the amount of the air bypassing the heater core 160 and the amount of the air passing the heater core 160.

Figure 2:
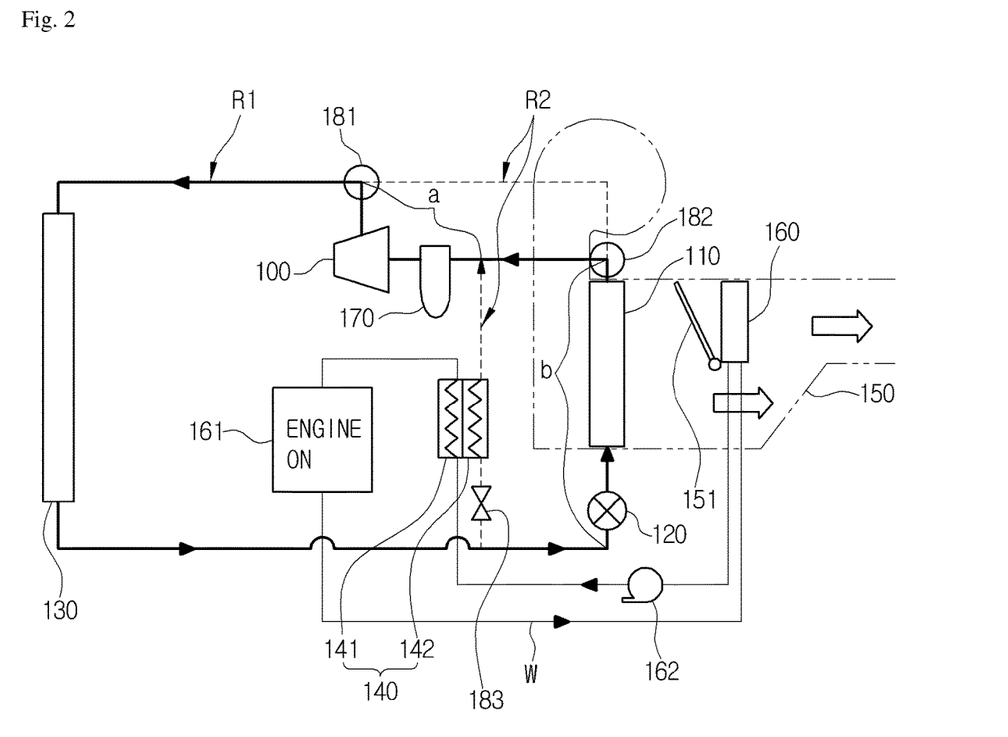
Figure 4:
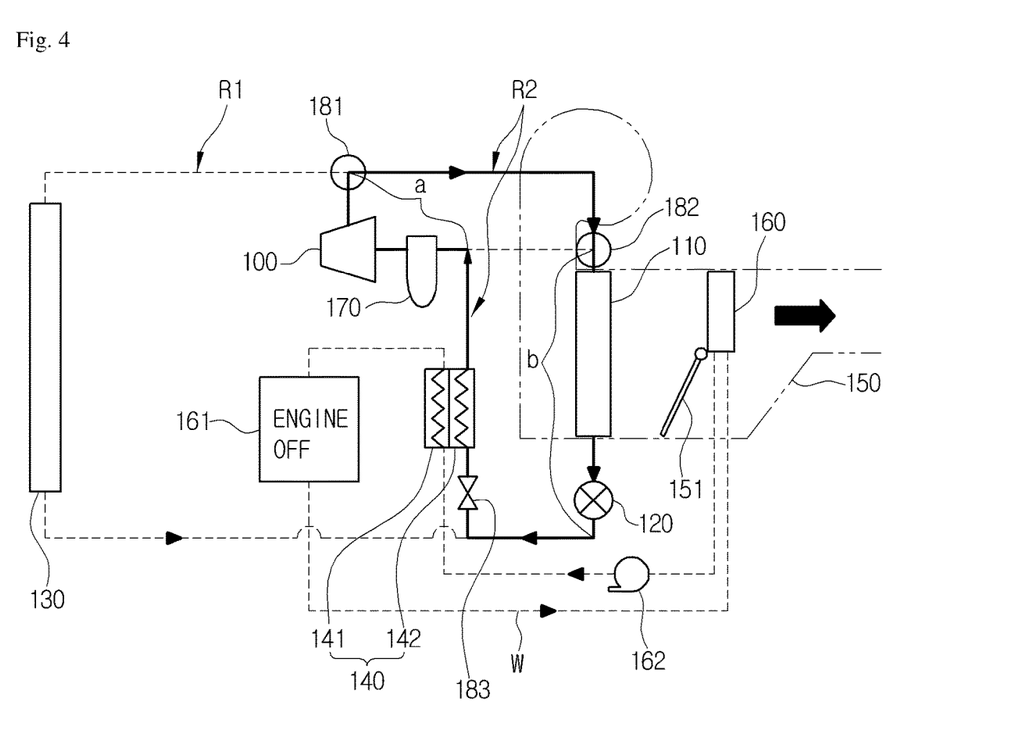
FIG. 4 is a configurative diagram of a heat pump mode of the heat pump system in a state where the engine is turned off.

In this instance, as shown in FIG. 2, in the air-conditioning mode, when a passage in front of the heater core 160 is completely closed by the temperature adjustable door 151, cold air passing the evaporator 110 bypasses the heater core 160 and is supplied to the interior of the vehicle so as to carry out the maximum cooling. As shown in FIG. 4, in the heat pump mode, when a passage bypassing the heater core 160 is completely closed by the temperature adjustable door 151, all of the air is changed into warm air while passing the heater core 160 and is supplied to the interior of the vehicle so as to carry out the maximum heating.

Moreover, in order to exchange heat between the waste heat of the engine 161 of the vehicle and the refrigerant, the waste heat exchanger 140 includes: a refrigerant heat exchanging part 142 connected with the second refrigerant circulation line R2 in such a way that the refrigerant flows therein; and a cooling water heat exchanging part 141 connected with the cooling water circulation line W in such a way that the cooling water flows therein. The waste heat exchanger 140 exchanges heat between the refrigerant of the refrigerant heat exchanging part 142 and the cooling water of the cooling water heat exchanging part 141.

The waste heat exchanger 140 serves to evaporate the refrigerant by exchanging heat between the refrigerant and the waste heat of the engine 161 in the heat pump mode. That is, in the heat pump mode, the waste heat exchanger 140 exchanges heat between the refrigerant which passes the compressor 100, the evaporator 110 and the expansion means 120 and the cooling water (engine waste heat) of the engine 161, and in this process, the refrigerant is evaporated and supplied to the compressor 100.

In other words, as shown in FIG. 4, in the heat pump mode, the waste heat exchanger 140 exchanges heat between the remaining heat of the cooling water and the refrigerant discharged from the expansion means 120 even though the cooling water of the engine 161 does not circulate in the cooling water circulation line W, so as to evaporate the refrigerant.

Of course, FIG. 4 illustrates the case that the cooling water of the engine 161 does not circulate the cooling water circulation line W when the engine 161 is turned off, but even in the case that the engine 161 is turned off, the heat pump system can circulate the cooling water by operating the water pump 162. In this case, the remaining heat of the engine 161 may be used.

It is preferable that the waste heat exchanger 140 be a plate type heat exchanger.

Furthermore, an on-off valve 183 is mounted on the second refrigerant circulation line R2 of an inlet side of the waste heat exchanger 140. The on-off valve 183 is closed in the air-conditioning mode but is opened in the heat pump mode.

Meanwhile, the heat pump mode according to the preferred embodiment of the present invention is operated only in the case that the engine 161 is turned off. That is, there is no need to operate the heat pump mode because the cooling water heated by the engine 161 circulates toward the heater core 160 to carry out heating when the engine 161 is turned on. The heat pump mode is operated for heating only when the engine 161 is turned off, and in this instance, the waste heat (cooling water) of the engine 161 is used.

Additionally, an accumulator 170 is mounted at an inlet side of the compressor 100, namely, is mounted at the inlet side of the compressor 100 which is located in the common section (a) of the first and second refrigerant circulation lines R1 and R2.

The accumulator 170 divides the refrigerant introduced into the compressor 100 into a liquid-phase refrigerant and a gas-phase refrigerant, such that only the gas-phase refrigerant is supplied to the compressor 100.

Moreover, the first direction-changing valve 181 for changing a flow direction of the refrigerant is mounted at a point where the first and second refrigerant circulation lines R1 and R2 are branched at an outlet side of the compressor 100, such that the refrigerant discharged from the compressor 100 flows toward the first refrigerant circulation line R1 or the second refrigerant circulation line R2 according to the air-conditioning mode or the heat pump mode.

Therefore, in the air-conditioning mode, by a direction change of the first direction-changing valve 181, the refrigerant discharged from the compressor 100 circulates along the first refrigerant circulation line R1 while flowing toward the exterior heat exchanger 130, but in the heat pump mode, by the direction change of the first direction-changing valve 181, the refrigerant discharged from the compressor 100 circulates the second refrigerant circulation line R2 while flowing toward the evaporator 110.

Furthermore, the second direction-changing valve 182 for changing a flow direction of the refrigerant is mounted at a point where the first and second refrigerant circulation lines R1 and R2 are branched at one side of the evaporator 110, such that the refrigerant discharged from the evaporator 110 flows toward the compressor 100 along the first refrigerant circulation line R1 in the air-conditioning mode and the refrigerant discharged from the compressor 100 flows toward the evaporator 110 along the second refrigerant circulation line R2 in the heat pump mode.

The second direction-changing valve 182 will be described based on a refrigerant flow direction of FIG. 4. The second direction-changing valve 182 is mounted at the branch point of the first and second refrigerant circulation lines R1 and R2, which is located at the inlet side of the evaporator 110.

As described above, in the air-conditioning mode and the heat pump mode, the heat pump system according to the preferred embodiment of the present invention commonly uses the evaporator 110 mounted inside the air-conditioning case 150 for heating and cooling, such that the heat pump system can be applied without any change in structure of the air-conditioning case 150 so as to reduce weight and manufacturing costs.

Additionally, the heat pump system according to the preferred embodiment of the present invention can reduce the number of the components and manufacturing costs because it does not need the interior heat exchanger which is used in the conventional heat pump system.

In addition, the heat pump system according to the preferred embodiment of the present invention can be operated even at low temperature without any influence of outdoor temperature because using the waste heat of the engine 161, thereby enhancing fuel efficiency and increasing heating performance and efficiency. That is, in a low-temperature environment, the heat pump system carries out heating using the heater core 160 in a section that the vehicle runs by the engine 161 but carries out heating by operating the heat pump mode using the waste heat of the engine 161 in a section that the vehicle runs by the electric motor even though the engine 161 is turned off, thereby enhancing fuel efficiency in the low-temperature environment by preventing a forced operation of the engine 161 due to a lack of heating.

Hereinafter, the action of the heat pump system for the vehicle according to the preferred embodiment of the present invention will be described.

A. Air-Conditioning Mode (when the Engine is Turned on) (See FIG. 2)

In the air-conditioning mode that the engine 161 is turned on, as shown in FIG. 2, refrigerant circulates along the first refrigerant circulation line R1 by control of the first direction-changing valve 181, the second direction-changing valve 182 and the on-off valve 183.

Moreover, because the engine 161 is turned on, the cooling water of the engine 161 circulates toward the heater chore 160 and the waste heat exchanger 140 by the water pump 162.

In the meantime, in order to achieve the maximum cooling, the temperature adjustable door 151 inside the air-conditioning case 150 closes the passage passing through the heater core 160, so that the air blown into the air-conditioning case 150 by a blower is cooled while passing through the evaporator 110, and then, is supplied to the interior of the vehicle by bypassing the heater core 160 to thereby cool the interior of the vehicle.

Of course, temperature of the air supplied to the interior of the vehicle can be adjusted by the temperature adjustable door 151.

Continuously, a refrigerant circulation process will be described.

The gas-phase refrigerant of high-temperature and high-pressure discharged after being compressed in the compressor 100 is supplied to the exterior heat exchanger 130 through the first direction-changing valve 181.

The refrigerant supplied to the exterior heat exchanger 130 is condensed while exchanging heat with the outdoor air, and hence, the gas-phase refrigerant is converted into a liquid-phase refrigerant.

Continuously, the refrigerant passing through the exterior heat exchanger 130 is decompressed and expanded while passing through the expansion means 120 to thereby become a liquid-phase refrigerant of low-temperature and low-pressure, and then, is introduced into the evaporator 110.

The refrigerant introduced into the evaporator 110 is evaporated by exchanging heat with the air blown into the air-conditioning case 150 by the blower, and at the same time, cools the air through a heat absorption by an evaporative latent heat of the refrigerant, and then, the cooled air is supplied to the interior of the vehicle to cool the interior.

After that, the refrigerant discharged from the evaporator 110 is introduced into the compressor 100 through the second direction-changing valve 182, and recirculates the above cycle.

B. Air-Conditioning Mode (when the Engine is Turned Off) (FIG. 3)

Figure 3:
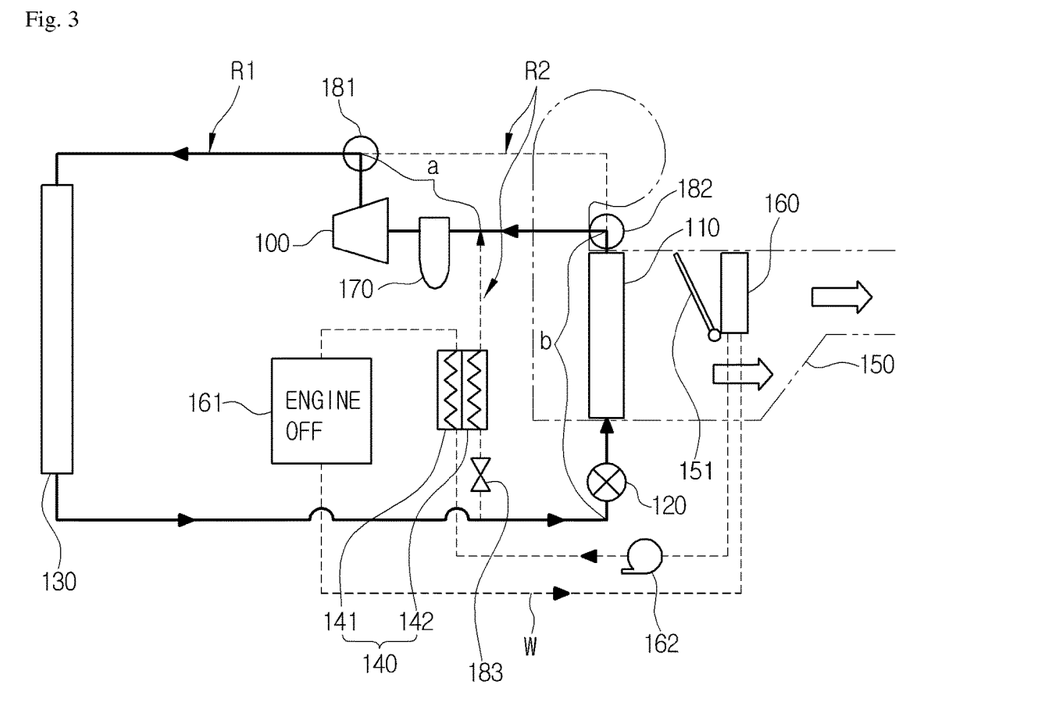
FIG. 3 is a configurative diagram of the air-conditioning mode of the heat pump system in a state where the engine is turned off.

In the air-conditioning mode that the engine 161 is turned off, as shown in FIG. 3, refrigerant circulates along the first refrigerant circulation line R1 by control of the first direction-changing valve 181, the second direction-changing valve 182 and the on-off valve 183.

In this instance, when the engine 161 is turned off, the water pump 162 is stopped, such that the cooling water does not circulate toward the heater core 160 and the waste heat exchanger 140.

In the meantime, in order to achieve the maximum cooling, the temperature adjustable door 151 inside the air-conditioning case 150 closes the passage passing through the heater core 160, so that the air blown into the air-conditioning case 150 by the blower is cooled while passing through the evaporator 110, and then, is supplied to the interior of the vehicle by bypassing the heater core 160 to thereby cool the interior of the vehicle.

Additionally, the refrigerant circulation process will not be described because it is the same as the air-conditioning mode that the engine 161 is turned on, which is described above.

C. Heat Pump Mode (when the Engine is Turned Off) (FIG. 4)

In the heat pump mode that the engine 161 is turned off, as shown in FIG. 4, refrigerant circulates along the second refrigerant circulation line R2 by control of the first direction-changing valve 181, the second direction-changing valve 182 and the on-off valve 183.

In this instance, when the engine 161 is turned off, as shown in FIG. 4, the cooling water does not circulate toward the heater core 160 and the waste heat exchanger 140, but the heat pump system can circulate the cooling water by operating the water pump 162.

Moreover, in the case that the engine 161 is turned off, the heat pump system uses the remaining heat of the cooling water of the engine 161 as a heat source.

In the meantime, in order to achieve the maximum heating, the temperature adjustable door 151 inside the air-conditioning case 150 closes the passage bypassing the heater core 160, so that the air blown into the air-conditioning case 150 by the blower is changed into warm air while passing through the evaporator 110 which serves as a heater, and then, is supplied to the interior of the vehicle to thereby heat the interior of the vehicle.

Continuously, a refrigerant circulation process will be described.

The gas-phase refrigerant of high-temperature and high-pressure discharged after being compressed in the compressor 100 is supplied to the evaporator 110 through the first direction-changing valve 181 and the second direction-changing valve 182.

The refrigerant of high-temperature and high-pressure supplied to the evaporator 110 is condensed while exchanging heat with the air flowing inside the air-conditioning case 150 so as to heat the air, and then, is supplied to the interior of the vehicle so as to heat the interior of the vehicle.

Continuously, the refrigerant passing through the evaporator 110 is decompressed and expanded while passing through the expansion means 120 to thereby become a liquid-phase refrigerant of low-temperature and low-pressure, and then, is introduced into the waste heat exchanger 140.

The refrigerant introduced into the waste heat exchanger 140 is evaporated while exchanging heat with the cooling water (waste heat) of the engine 161.

After that, the refrigerant discharged from the evaporator 110 is introduced into the compressor 100, and then, recirculates the above cycle.

What is claimed is:

1. A heat pump system for a vehicle comprising:
    a compressor for compressing and discharging a refrigerant;
    an evaporator mounted inside an air-conditioning case for exchanging heat between the air inside the air-conditioning case and the refrigerant;
    an exterior heat exchanger mounted outside the air-conditioning case for exchanging heat between the refrigerant and the outdoor air;
    expansion means arranged between the evaporator and the exterior heat exchanger for expanding the refrigerant;
    a waste heat exchanger for exchanging heat between waste heat of the vehicle and the refrigerant;
    an accumulator for dividing the refrigerant introduced into the compressor into a liquid-phased refrigerant and a gas-phase refrigerant and supplying only the gas-phase refrigerant to the compressor;
    a first refrigerant circulation line (R1) which connects a refrigerant line in such a manner that refrigerant discharged from the compressor circulates the exterior heat exchanger, the expansion means, the evaporator, the accumulator and the compressor in order in an air-conditioning mode;
    a second refrigerant circulation line (R2) which connects a refrigerant line in such a manner that refrigerant discharged from the compressor circulates the evaporator, the expansion means, the waste heat exchanger, the accumulator and the compressor in order in a heat pump mode, wherein the evaporator is used commonly in such a way as to carry out a cooling action in the air-conditioning mode and to carry out a heating action in the heat pump mode;

wherein the first refrigerant circulation line (R1) and the second refrigerant circulation line (R2) use partial sections of the first and second refrigerant circulation lines (R1, R2) in common;

wherein the common sections of the first and second refrigerant circulation lines (R1, R2) are a section (a) to which the compressor is connected and a section (b) to which the evaporator and the expansion means are connected;

wherein the accumulator is mounted at an inlet side of the compressor in the common section (a) of the first and second refrigerant circulation lines R1 and R2; and wherein the expansion means is mounted at the common section (b) of the first and second refrigerant circulation lines (R1, R2), which is located at one side of the evaporator, and is expanded bidirectionally relative to the refrigerant flowing along the first refrigerant circulation line (R1) and the refrigerant flowing along the second refrigerant circulation line (R2);

wherein a first direction-changing valve for changing a flow direction of the refrigerant is mounted at a point where the first and second refrigerant circulation lines (R1, R2) are branched at an outlet side of the compressor, such that the refrigerant discharged from the compressor flows toward the first refrigerant circulation line (R1) or the second refrigerant circulation line (R2) according to the air-conditioning mode or the heat pump mode;

wherein a second direction-changing valve for changing a flow direction of the refrigerant is mounted at a point where the first and second refrigerant circulation lines (R1, R2) are branched at one side of the evaporator, such that the refrigerant discharged from the evaporator flows toward the compressor along the first refrigerant circulation line (R1) in the air-conditioning mode and the refrigerant discharged from the compressor flows toward the evaporator along the second refrigerant circulation line (R2) in the heat pump mode.

2. The heat pump system according to claim 1, further comprising:
a heater core mounted inside the air-conditioning case, the heater core being connected with an engine of the vehicle through a cooling water circulation line (W).

3. The heat pump system according to claim 2, wherein the waste heat exchanger comprises: a refrigerant heat exchanging part connected with the second refrigerant circulation line (R2) in such a way that the refrigerant flows therein so as to exchange heat between the waste heat of the engine and the refrigerant; and a cooling water heat exchanging part connected with the cooling water circulation line (W) in such a way that the cooling water flows therein, such that the waste heat exchanger exchanges heat between the refrigerant of the refrigerant heat exchanging part and the cooling water of the cooling water heat exchanging part.

4. The heat pump system according to claim 1, wherein an on-off valve is mounted on the second refrigerant circulation line (R2) at an inlet side of the waste heat exchanger, the on-off valve being closed in the air-conditioning mode and opened in the heat pump mode.

* * * * *